Figure 1:
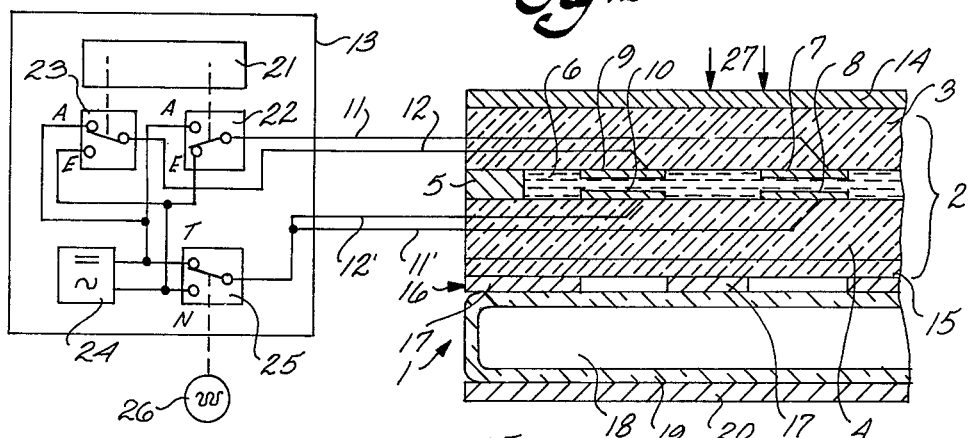

United States Patent [19]

Thuler

[11] 4,104,627
[45] Aug. 1, 1978

[54] DIGITALE, AN INDICATING DEVICE CONTAINING LIQUID CRYSTALS

[75] Inventor: Oscar W. Thuler, Bern, Switzerland

[73] Assignee: Merz & Bentili Nuklear AG, Bern, Switzerland

[21] Appl. No.: 573,930

[22] Filed: May 2, 1975

[30] Foreign Application Priority Data

May 3, 1974 [CH] Switzerland .................. 6082/74

[51] Int. Cl.² .............................................. G02F 1/13
[52] U.S. Cl. ................................. 340/336; 340/378 R; 350/330
[58] Field of Search ............... 340/336; 350/160 LC; 58/50 R

[56] References Cited

U.S. PATENT DOCUMENTS

| 3,712,047 | 1/1973 | Girard | 58/50 R |
|---|---|---|---|
| 3,721,084 | 3/1973 | Dargent | 58/50 R |
| 3,751,137 | 8/1973 | Fitzgibbons et al. | 340/336 |
| 3,756,694 | 9/1973 | Soree et al. | 350/160 LC |
| 3,758,195 | 9/1973 | Hedman et al. | 340/33 G |
| 3,841,083 | 10/1974 | Bergey | 350/160 LC |
| 3,846,775 | 11/1974 | Epstein | 350/160 LC |
| 3,873,186 | 3/1975 | Ritchie | 350/160 LC |
| 3,897,137 | 7/1975 | Dobbins | 350/160 LC |
| 3,938,318 | 2/1976 | Collins | 340/336 |
| 3,950,078 | 4/1976 | Zatsky | 350/160 LC |
| 3,963,312 | 6/1976 | Wild | 350/160 LC |

OTHER PUBLICATIONS

IBM Tech. Disc. Bull., vol. 15, No. 8, Jan. 1973, W. R. Young, "Combination Reflective/Transmissive Liquid Crystal Display", 2 pp.

*Primary Examiner*—David L. Trafton
*Attorney, Agent, or Firm*—Christie, Parker & Hale

[57] ABSTRACT

A liquid crystal cell has first and second planar, approximately parallel, spaced-apart spaces between which a liquid crystal is disposed, and a plurality of light transmissive, electrically conductive electrode pairs on opposite sides of the liquid crystal corresponding to the character regions to be displayed. The first face of the cell is exposed to ambient light. A light source is disposed adjacent to the second face of the cell to direct light through the cell toward the first face. Electrical control signals corresponding to the different characters to be displayed are generated to impress an electrical potential difference across selected combinations of the electrode pairs corresponding to different characters to be displayed, thereby deactivating the liquid crystal between such electrode pairs. In the presence of ambient light incident upon the first face of the cell, the characters are displayed as light characters on a dark background at the first face of the cell responsive to the control signals. In the absence of ambient light incident upon the first face of the cell, the characters are displayed as dark characters on a light background at the first face of the cell responsive to the control signals.

15 Claims, 4 Drawing Figures

DIGITALE, AN INDICATING DEVICE CONTAINING LIQUID CRYSTALS

BACKGROUND OF THE INVENTION

The invention concerns a digital indicating device, which consists of a liquid crystal that is placed between transparent plates. These plates are placed between two polarization filters and are arranged in a cell which is situated in a cabinet. The liquid crystal displays optical rotary power which can be controlled by an electric field. The portions of the plates of the cell corresponding to the character regions which are to be displayed have light-transmissive electrode pairs made from an electrically conducting material. Electrical fields perpendicular to the plates are established between selective electrode pairs responsive to an electronically controlled driving circuit.

In the known indicating devices of the above-mentioned type, the liquid crystal typically contains a nematic compound which causes the direction of polarization of the incident light to rotate 90°. The polarization filters are crossed, so light from the surroundings which shines onto the device passes through the second polarization filter because of the activity of the liquid crystal; this light is reflected from a mirror placed behind this filter and returns through the cell to the eye of the observer. When an electric field is established between selected electrode pairs, the liquid crystal between these selected electrode pairs is deactivated and no longer rotates the light polarization. This causes no light to pass through the second polarization filter under the selected electrode pairs and as a result no light is reflected back to the observer. The character or numerical regions which correspond to these selected electrode pairs, therefore, appear as dark spots to the eye of the observer.

Indicating devices of the above-mentioned type, in principle, use ambient light from the surroundings e.g. daylight, so that a reading at night is not possible. Attempts have been made to illuminate the face of the cell with a radioactive light source and in so doing to simulate the surrounding light. The illumination intensities which are achieved in this way, are so weak that an easily readable display cannot be produced.

It would be plausible to set up a light source - in particular a radioactive one - in such a way, that the light from this source after passing through the initially-mentioned indicating device reaches the eye of the observer, which means operating the indicating device such that it transmits and does not reflect. However, in this case, considerable difficulties with respect to day and night display occur. If the displayed characters or figures appear as dark areas on a light background when exposed to the surroundings, this results in poor legibility at night.

The aim of the invention in question, is therefore, to create a digital indicating device of the foregoing type in which the physiologically favourable reading of the displayed characters is made possible, i.e., dark characters on a light background if the surroundings are light, and light characters on a dark background, if the surroundings are dark. The indicating device should be compact enough to install into a measuring or display instrument e.g., in electronic pocket calculators.

SUMMARY OF THE INVENTION

According to the invention, a liquid crystal digital indicating device is characterized in the following way: a partly light-transmissive reflector followed by a light source are installed adjacent to the second polarization filter in such a way, that a controllable display of characters during daylight hours takes place by selective reflection of the ambient light from the surroundings — and at night, by selective transmission of the light from a radioactive light-source, and the light-transmissive and the non-transmissive areas of the indicating device are reversible in such a way, that during daylight hours the background areas adjoining the character areas of the indicating device are light-transmissive and therefore light, to the eye of the observer while the character areas are then dark — and at night the character areas are transmissive and, therefore, light, while the adjoining background areas are dark.

The reversibility of the light-transmissive and light-non-transmissive areas of the indicating device can be achieved as follows: the controlled driving circuit is connected to the electrodes through a switching device such that in one switch position for a given state of the driving circuit the respective electrode pairs of given character regions show a difference in potential in order to generate the appropriate electric field, and in the other switch position these electrode pairs have the same potential for the same given state of the driving circuit e.g. a short-circuit.

As an alternative, reversibility can be achieved with an auxiliary cell having a liquid crystal between plates placed between the second polarization filter and the adjoining cell plate. The liquid crystal has a controllable optical rotation. The entire surface of the plates of the auxiliary cell are covered with light-transmissive electrodes made out of an electrical conducting material, and connected through a control device to a power source.

Another alternative way of achieving reversibility is as follows: one polarization filter is placed in a plane parallel to the plane of the cell such that it can be rotated or moved between two extreme positions, in such a way that the polarization direction of the polarization filter in its one extreme position is at right angles to that in its other extreme position.

Figure 2:
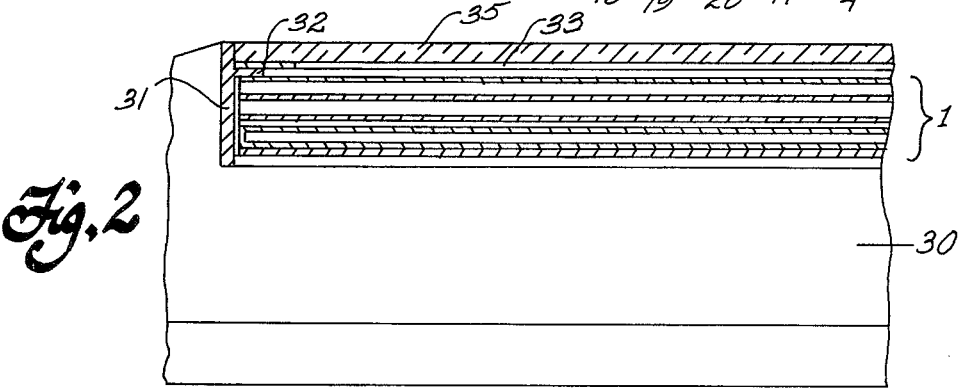

Rooms of construction cited by way of example in this patent specification are explained in the following based on the drawings, the figures of which show:

FIG. 1 Sectional View: a part of an initial indicating device with an electrical day-night changeover and a diagrammatic representation of an accompanying electronic control unit FIG. 2 Side View, partly in section; a part of a unit cabinet with the indicating device of FIG. 1

Figure 3:
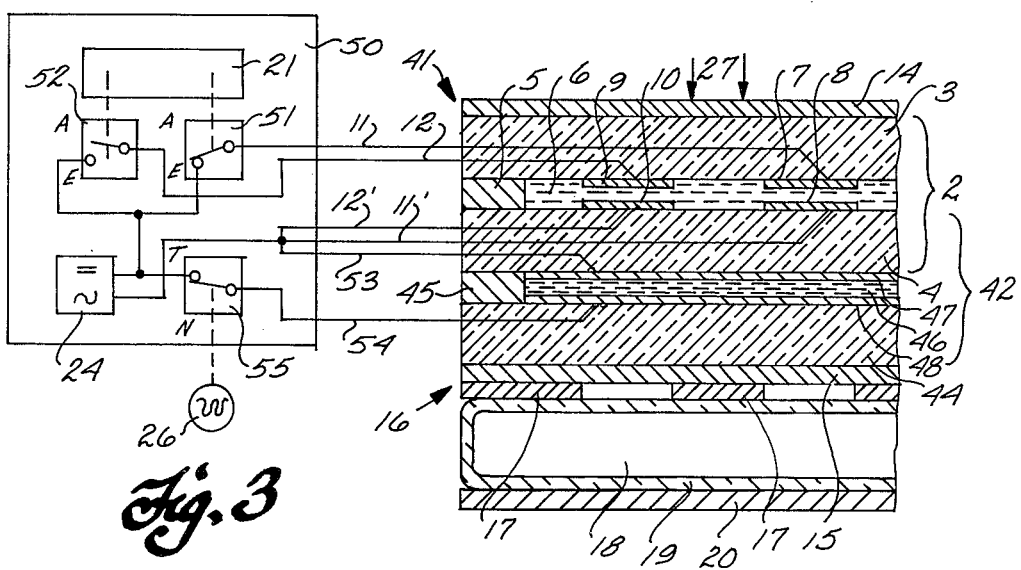
Figure 4:
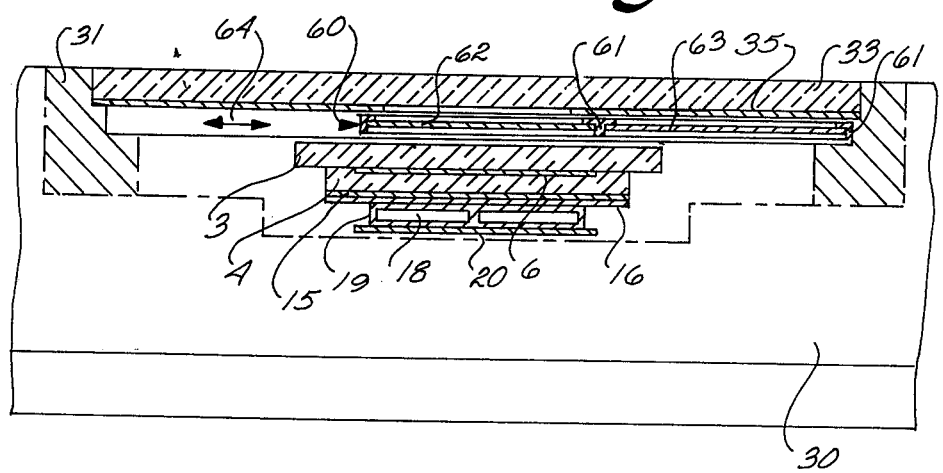

FIG. 3 Sectional View; a part of a second indicating device with an electro-optical day-night changeover and a diagrammatic representation of an accompanying electronic control unit FIG. 4 Sectional View of a third indicating device with a mechanical-optical day-night changeover in a unit cabinet.

FIG. 1 shows a part of a stacked indicating device 1, which contains a cell 2, consisting of two glass plates 3 and 4, a flat spacing element 5 placed between the glass plates and a liquid crystal 6, which is placed in the void bounded by the glass plates 3 and 4 and the spacing element 5. As is known, the liquid crystal contains a substance, e.g. a nematic compound, which shows optical rotary power which can be electronically controlled. In particular, the liquid crystal has a helical molecule structure in a direction perpendicular to the glass plates 3 and 4, so that the direction of polarization of the transmissive, linearly polarized light follows the direction of the helical axis of the crystal structure.

Several electrodes 7, 8 and 9, 10 are situated in pairs on the inner surfaces of the glass plates 3 and 4. These electrodes are light-transmissive and consist of an electrically conducting material, e.g. zinc oxide which has been deposited by vaporization or by some other means in a thin layer on the glass plates 3 and 4. The area covered by the light-transmissive electrodes 7, 8, 9 and 10 corresponds to the characters or character segments which are to be displayed, for example, single straight-lined segments for displaying the numbers 0 to 9. Each pair of electrodes 7, 8 and 9, 10 is connected by the accompanying electric leads 11, 11', 12, 12' to a control and driving unit 13, which will be described in more detail further on. The one electrode of each pair of electrodes e.g. the electrodes 8, 10 can also be used as common anti-electrodes for all electrode pairs of the same character.

A polarization filter film 14 and 15 has been placed on the outer surfaces of the glass plates 3, 4. Adjoining the lower polarization filter 15 in FIG. 1 is a partly light-transmissive reflector 16, also in the form of a film, which in addition has been shaped in such a way as to be opaque when seen in a direction at right angles to glass plates 3, 4 on those areas 17, corresponding to areas of the glass plates 3, 4 not covered by the electrodes 7, 8 and 9, 10.

A radioactive light-source 18 adjoins the reflector 16. This light-source contains several hollow, sealed glass bodies 19, of which only one can be seen in FIG. 1. Several of these glass bodies 19, which cover the total area of the indicating device in one direction are placed alongside each other. Each glass body 19 contains, in an already known way, a luminophor, e.g. zinc sulfide, which has been deposited, for example, on the inner walls of the glass body or has been placed in the form of powder grain inside the glass body. Each glass body also contains a gaseous radioisotope, e.g. tritium or crypton.

The light which is emitted in all directions from the light source 18 is partly surrounded by a metal reflector 20, which reflects the downwards and laterally emitted light, so that the largest portion of the light emitted from light source 18 leaves in the direction of the liquid crystal 6. In addition to this, the reflector 20 serves as an effective protection from radioactive radiation.

In the following, the sequence and driving circuit which is diagrammatically shown in FIG. 1, is described in more detail, where to keep things simple, the arrangement and control of only two pairs of electrodes 7, 8, and 9, 10 are considered. In practice, of course, there is a much larger number of electrode pairs, e.g. depending on the composition of the FIGS. 0 to 9 — a maximum of 7 segments — and on the number of figures to be displayed.

The sequence and driving circuit 13 contains therefore, as is known, an electronically, battery-powered sequencing circuit 21 e.g. a calculating or measuring setup, which generates output signals and controls a decoding and driving circuit which are also battery-powered, and passes on the control potentials which correspond to the results of the calculation or measurement, to the individual electrode pairs 7, 8 and 9, 10. The decoding circuit mentioned but not shown in FIG. 1 has on the output side to each electrode pair 7, 8 and 9, 10, assigned electronic selecting switches 22, 23, which are diagrammatically shown in FIG. 1 and have been added in order to either pass a potential on to, or short-circuit the assigned pair of electrodes, depending on the calculation or measurement.

This controlled potential-feed is supplied by a power source 24 which can be a battery in the most simple case. In order to reduce the ohm losses, which result from the flow of current within the liquid crystal, and as such to increase the life of the battery, the power source 24 can also generate an alternating current e.g. a square-wave voltage with a frequency of at least 20 Hz. A simple way of generating this alternating current with the mentioned frequency is to electronically switch the battery power on or off.

As is diagrammatically shown in FIG. 1, the selectively wired connections of the selection switches 22, 23 are connected to the output clamps of the voltage source 24, whereas the fixed connection of each selection switch to the corresponding electrodes 7 or 9 takes place through the leads 11 or 12. The other electrodes 8, 10 of the electrode pairs are connected through the leads 11', 12' in the sequence and driving circuit 13, to each other and to the fixed contact connection of a further selection switch 25. If these electrodes are formed as common anti-electrode per character, which are also electrically connected together within the indicating device 1, this common electrode is then connected only through a single lead with the mentioned fixed contact connection of the selecting switch 25. The selectively wired contact connections of the selecting switch 25 are also connected to the clamps of the voltage source 24.

The additional selecting switch 25, which serves to switch over the day and night display, can be a manually operated mechanical switch, which is built into the clock. An automatic switch controlled by the surrounding brightness can be realized if switch 25 is set up as an electronic switch, e.g. a Schmitt-Trigger which is controlled by the current from a solar cell 26 activated by the incident surrounding light.

The electronic parts shown in FIG. 1, namely the sequence and decoding circuit 21 and the electronic selecting switches 22, 23 and 25 can best be made as a compact electronic circuit e.g. an integrated circuit.

The way in which the construction shown in FIG. 1 operates is as follows:

In the presented switch positions E and A of the switches 22 and 23, which correspond to a fixed position of the sequence circuit 21, and in the shown position T of switch 25, which corresponds to the "day" position, electrode 7 of the one electrode pair of the indicating device 1 is connected to a terminal of the voltage source 24 through the lead 11 and the switch 22. The corresponding electrode 8 is connected to the other clamp of the voltage source 24, through the lead 11' and the switch 25, so that there is a potential difference between electrodes 7, 8. The one electrode 9 of the other electrode pair is connected to the voltage source 24 through the lead 12. The corresponding electrode 10 is connected to this same clamp through the lead 12' and switch 25, meaning that electrodes 9, 10 are short-circuited i.e., have the same potential.

The incident light on the indicating device 1, following the arrow 27 from the surroundings, is linearly polarized through the first polarization filter and passes through the liquid crystal 6 between the electrodes 7, 8 and 9, 10. The helical structure of the liquid crystal and as a result its optical activity disappear because of the electric field present between the electrodes 7, 8 due to the difference in potential. Thus, the linearly polarized light passes through the liquid crystal 6 in this spot with hardly any change in direction of polarization. The second polarization filter 15, whose direction of polarization is at right angles to the first polarization filter, causes the light leaving the liquid crystal 6 at electrodes 7, 8 to be absorbed, causing the region on the indicating device 1 which corresponds to the area covered by electrode 7 to appear as dark in the eye of an observer.

The conditions for light falling on the position of electrodes 9, 10 on the liquid crystal 6 are reversed. Because these electrodes have been short-circuited and therefore do not adjoin an electric field, liquid crystal 6 is optically active here. Therefore, the direction of polarization of the incident linearly polarized light is changed by 90° by liquid crystal 6. Its direction of polarization therefore corresponds with that of the second polarization filter 15, so that it is reflected by reflector 20. The reflected light reaches the liquid crystal 6 at its place of electrodes 9, 10 and is turned another 90° by the liquid crystal, so that the reflected light reaching the first polarization filter 14 has the same direction of polarization as this filter and therefore can pass through it, making the visible area on the indicating device which corresponds to electrode 9 appear lit-up to the eye of an observer. This is also the case for those regions on liquid crystal 6, where no electrodes have been placed. Thus, the observer sees the areas on the visible surface which have been activated by the described sequence and driving circuit 13 as dark dashes which correspond to numbers on a light background which ensures the best legibility.

When the surroundings are dark, the light emitted from the radioactive light source 18, reaches the viewing surface of the described indicating device via the polarization filter 15, the liquid crystal 6 and the polarization filter 14. Because the directions of polarization of the transmitted light, at the same position of the sequence and driving circuit 13 are changed or not effected as in the above described illumination by the light of the surroundings, the activated dashlike areas also appear dark on a light background, which considerably reduces the recognizability of the figures which are to be displayed. If the switch 25 is now switched over to its other position N ("night") — this can be done manually or by the brightness-dependent automatic control using solar cell 26 — the potential conditions at electrodes 7, 8 and 9, 10 are reversed, which is straightforward. In other words for the same instant in time, i.e., the same switching position of switches 22 and 23, the electrodes 7, 8 are short-circuited, while electrodes 9, 10 show a potential difference. Seeing that in addition to the emitted light from the radioactive light source 18, which is absorbed in areas where there are no electrodes by the light-transmissive positions 16 of the reflector 15, the activated, dashlike, areas which form the displayed figures, appear as light areas on a dark background in the eye of an observer which ensures an optimal readability.

FIG. 2 shows, for example, the assembly of the indicating device shown in FIG. 1 in a sectional view of the cabinet 30. The indicating device 1 has been placed in a frame 31 in the cabinet 30, which shows a projection 32 along the whole inner perimeter, which serves as a support for a cover glass 33. Lateral covers 35 limit the field of vision to the area of the figures which are to be displayed.

In variation 3 another device for changing from day to night display has been provided. The stacked indicating device 41 also contains the cell 2 with glass plates 3 and 4, the spacing element 5 and the liquid crystal 6, with electrodes 7, 8 and 9, 10 arranged in pairs along the inner surfaces of the glass plates 3, 4. The first polarization filter 14 is placed at the outer surface of glass plate 9.

Glass plate 4 simultaneously forms part of the auxiliary cell 42, which contains a further glass plate 44 which is separated from glass plate 4 by means of a flat spacing element 45. The void which is bounded on one side by this spacing element 45 also contains a liquid crystal 46, which is preferably of the same composition as liquid crystal 6 of cell 2. The inner surfaces of glass plates 4, 44 with respect to auxiliary cell 42 have each been equipped with light-transmissive electrodes 47 and 48, made of electrical conducting material.

Adjoining the glass plate 44 is the second polarization filter 15; then follow the reflector 16 and the radioactive light source 18, which is partly surrounded by reflector 20.

The accompanying sequence and driving circuit 50 also contains the electronic, battery-powered control circuit 21, which controls the electronic switches 51 and 52 assigned to each electrode pair 7, 8 and 9, 10 based on the calculation or measuring result via a decoding circuit which has not been described in any detail. The contacts of switches 51, 52, which are formed as simple on-off switches are connected via leads 11, 12 to the one electrode 7, 9 of the electrode pairs, while their other contacts are made on one of the clamps of the power source 24. The other electrodes 8, 10 of the electrode pairs are connected to the other clamp of the power source 24 through the leads 11', 12'.

The one electrode 47 of the auxiliary cell 42 is also connected by a lead 53 to the second clamp of the power source 24. The electrodes 8, 10 and 47 can, of course, also already be electrically linked to each other within the indicating device 41.

A lead 54 connects the other electrode 48 in the auxiliary cell 42 with the one contact of a further electronic switch 55, e.g. a Schmitt-Trigger, whose other contact is connected to the clamp of the power source 24, to which the electrodes 7, 9 are also connected through switches 51, 52. In order to control switch 55, a solar cell 26 which is subject to light from the surroundings, has been placed in the cabinet. As will be explained below, the position of switch 55 corresponds to illumination of the solar cell 26 by the surrounding light, i.e., switching position "day."

The way in which the construction shown in FIG. 3 functions is as follows:

When the indicating device 41 is illuminated by light from the surroundings, the calculation or measurement results are displayed as in the indicating device 1 in FIG. 1, i.e., the displayed figures appear dark on a light background. This happens because electrodes 47, 48 have a difference in potential (switch 55 off) and therefore produce an electric field which covers the whole region of the auxiliary cell 42. As a result liquid crystal 46 in the auxiliary cell 42 shows no optical activity i.e., it barely contributes to the light transmission.

When it is dark, transmission of the light emitted from the radioactive light source 18 takes place through the indicating device 42. Because the current of solar cell 26 is practically zero in the dark, electronic switch 55 changes its position, i.e., it opens, so that the electrodes 47, 48 of auxiliary cell 42 now have the same potential, because lead 54 is open. In the liquid crystal 46 which now has no field, the direction of polarization of the transmitted light from the radioactive light source 18 is turned 90°, so that the light with its 90° change of polarization direction reaches the polarization filter 14. Since polarization filters 14 and 15 are crossed, the direction of polarization of the light, which because of the potential difference of electrodes 7, 8 in the liquid crystal 6 of cell 2, corresponds with the direction of polarization of polarization filter 14. The figures which must be displayed appear to the eye of the observer as light, while the background remains dark.

The electronic switch 54 controlled by the solar cell 26, in the construction shown in FIG. 3 can, of course, be replaced by a mechanical switch which can be manually operated.

Mounting indicating device 41 of FIG. 3 into a cabinet can be done in the same way as in FIG. 2.

A further possibility when operating the present indicating device, to obtain dark characters on a light background by means of reflection, and when operating in transmission to obtain light characters on a dark background, consists of using mechanical turning or shifting one polarization filter whose direction of polarization for the one operating mode is deflected around 90° with respect to that in the other operating mode. FIG. 4 shows a form of construction, where in cabinet 30 in the mounting 31 another cell is placed, containing a liquid crystal between glass plates 3 and 4. Below the inner glass plate 4 a polarization filter 15 has been placed, under which reflector 16 and radioactive light source 18 with glass bodies 19 and the reflector 20 which accompanies light source 18 are placed. In the construction in FIG. 4 the electrodes assigned to the characters which are to be displayed are not shown for the sake of clarity, seeing the section which forms FIG. 4 has been laid in a position between two characters. The presented indicating device is covered towards the outside by means of a cover glass, below which the lateral covers 35 have been placed in order to limit the field of vision.

The other polarization filter, which is arranged as a slider 60, has been placed between the upper (outer) glass plate 3 of the cell and the cover glass 33. The slider 60 spans a frame 61 adjoining two fields. In each field a polarization filter part 62 and 63 has been placed, where both polarization filter parts 62, 63 are crossed, i.e., have directions of polarization which are at right angles to one another. The slider 60 can be moved backwards and forwards in the direction of the double arrow 64, so that in its one extreme position the polarization filter part 62 lies in the path of the rays and in the other extreme position, polarization filter 63. Moving slider 60 in the direction of the double arrow 64 can be done mechanically, electromagnetically or in any other way, e.g. also as a function of the surrounding light.

In the one position of slider 60 (FIG. 4), the surrounding light causes a dark display of the activated characters and number regions on a light background, by means of reflection on reflector 16, as has already been described. In darkness, illumination by light source 18 becomes effective. In order to now achieve a light display of activated character and number regions on a dark background, the slider 60 is moved to its opposite extreme position. In this position polarization filter part 63 is placed in front of the cell in the field of vision, so that the light and dark regions of display are reversed because of the direction of polarization of this filter section which has been deflected by 90°.

Radioactive light sources have been described in the construction forms treated until now, which basically cover the complete field of display. Seeing on the one hand, for a night display, only that part of the field of indication must be illuminated, where the character regions are, and on the other hand that it is important, for reasons of radiation protection to keep the levels of radioactive radiation and radioactive substances as low as possible, the radioactive light sources, in particular those with hollow glass bodies, containing a luminophor and a radioactive gas, can also be formed and arranged in different ways. For example, it is possible, for each character that is to be displayed, to arrange a thin glass body, which lies in a longitudinal direction of the character in question and is equipped with a gutter-shaped reflector, which produces a regular illumination of the total surface area of the character in question. A further possibility lies in the fact that for each character region which is to be displayed, i.e., for each segment of the several e.g. seven segments used to form a character, to arrange a separate glass body of correspondingly smaller dimensions. In both cases the necessary amount of radioactive gases required in total is considerably lower than for radioactive light sources, which cover the whole display area. Furthermore it is possible to arrange a single radioactive light source or a small amount of radioactive light sources in a lateral direction to the field of vision and to induce the lighting with known means such as e.g. optical methods which are based on total reflection. This is encompassed by the term "light emitting means" disposed adjacent to the liquid crystal cell.

Finally it is also possible, instead of radioactive light sources to provide other light sources, e.g. a bulb which uses a small amount of current, which is connected via a switch to a battery or some other power source.

I claim:

1. A digital indicating device comprising:
    a liquid crystal cell having first and second planar, approximately parallel, spaced-apart faces between which a liquid crystal showing optical rotary power is disposed, and a plurality of light transmissive, electrically conductive electrode pairs on opposite sides of the liquid crystal corresponding to character regions to be displayed, the first face of the cell being exposed to ambient light;
    first and second light polarizing means having directions of polarization at right angles to each other, the first and second light polarizing means being disposed adjacent to opposite sides of the liquid crystal cell parallel to the first and second planar faces thereof, respectively;
    light emitting means disposed adjacent to the second polarizing means on the side thereof opposite the second face of the cell to direct light through the cell toward the first face;
    a reflector disposed between the light emitting means and the second polarizing means, the reflector being light transmissive on the areas corresponding to the character regions;
    means for generating electrical control signals corresponding to the different characters to be displayed to impress an electrical potential difference across certain combinations of the electrode pairs to deactivate the liquid crystal between such electrode pairs;

first means responsive to the control signals for displaying the corresponding characters as dark characters on a light background at the first face of the cell in the presence of ambient light incident upon the first face of the cell; and second means responsive to the control signals for displaying the same corresponding characters as light characters on a dark background at the first face of the cell in the absence of ambient light incident upon the first face of the cell.

2. The digital indicating device of claim 1, in which the light emitting means is a radioactive light source consisting of at least one hollow sealed glass body containing a luminophor such as tritium or krypton.

3. The indicating device of claim 2, which additionally comprises a coating of reflective material deposited over the entire surface of the glass body except for the surface thereof adjacent to the second face of the cell.

4. The indicating device of claim 3, in which the characters defined by the character regions are arranged in a given direction and the glass body is elongated in the given direction.

5. The indicating device of claim 4, in which the light emitting means comprises a separate light source for each character position.

6. The indicating device of claim 1, in which the cell additionally comprises first and second spaced apart glass plates and a spacing plate therebetween that define an enclosure for the liquid crystal.

7. The indicating device of claim 6, in which the polarizing means are films deposited on the respective glass plates.

8. The indicating device of claim 1, additionally comprising a cabinet having a cover glass, the cell being disposed in the cabinet in spaced relationship from the cover glass.

9. The indicating device of claim 1, additionally comprising a manually operated switch for alternately activating the first and second displaying means.

10. The indicating device of claim 1, additionally comprising a solar cell for sensing ambient light and means responsive to the solar cell for alternately activating the first and second displaying means.

11. The indicating device of claim 1, in which:
the first displaying means comprises means responsive to the control signals for impressing across selected electrode pairs corresponding to the characters to be displayed an electrical potential difference to deactivate the liquid crystal between said selected electrode pairs while the remaining electrode pairs are at the same potential, thereby causing said selected electrode pairs to appear as dark characters;

the second displaying means comprises means responsive to the control signals for impressing across the remaining electrode pairs an electrical potential difference to deactivate the liquid crystal between said remaining electrode pairs while the selected electrode pairs are at the same potential, thereby causing the selected electrode pairs to appear as light characters; and the reflector is opaque on the areas not corresponding to the character regions.

12. The indicating device of claim 1, in which:
the first displaying means comprises
an additional liquid crystal cell disposed between the second face of the first mentioned cell and the second polarizing means, the additional liquid crystal cell having approximately parallel spaced apart faces between which a liquid crystal is disposed and a pair of light transmissive, electrically conductive electrodes covering the entire area of the additional cell on opposite sides of the liquid crystal, means for impressing across the electrode pair of the additional cell an electrical potential difference to deactivate the liquid crystal of the additional cell, and means responsive to the control signals for impressing across selected electrode pairs of the first mentioned cell corresponding to the characters to be displayed an electrical potential difference to deactivate the liquid crystal between said selected electrode pairs, while the remaining electrode pairs of the first mentioned cell are at the same potential, thereby causing the said selected electrode pairs to appear as dark characters;

the second displaying means comprises
means responsive to the control signals for impressing across the selected electrode pairs an electrical potential difference to deactivate the liquid crystal between said selected electrode pairs, while the remaining electrode pairs are at the same potential, thereby causing said selected electrode pairs to appear as light characters, and means for removing the electrical potential difference from the electrode pair of the additional cell to activate the liquid crystal of the additional cell;

the reflector is opaque on the areas not corresponding to the character regions.

13. The indicating device of claim 1, in which:
one of the displaying means comprises means responsive to the control signals for impressing across selected electrode pairs defining the characters to be displayed an electrical potential difference to deactivate the liquid crystal between said selected electrode pairs, while the remaining electrode pairs are at the same potential;

the other displaying means comprises
means for changing the first polarizing means to have the same direction of polarization as the second polarizing means, and means responsive to the control signals for impressing across said selected electrode pairs an electrical potential difference to deactivate the liquid crystal between said selected electrode pairs, while the remaining electrode pairs are at the same potential.

14. The indicating device of claim 13, in which the first polarizing means comprises a third polarization filter and a fourth polarization filter having directions of polarization at right angles to each other, and the changing means comprises means for interchangeably placing the third and fourth polarization filters adjacent to the first face of the cell to intercept light passing through the cell.

15. A digital indicating device comprising:
a liquid crystal cell having first and second planar, approximately parallel, spaced-apart faces between which a liquid crystal is disposed, and a plurality of light transmissive, electrically conductive electrode pairs on opposite sides of the liquid crystal corresponding to character regions to be displayed, the first face of the cell being exposed to ambient light;

light emitting means disposed adjacent to the second face of the cell to direct light through the cell toward the first face;

a reflector disposed between the light emitting means and the second face of the cell, the reflector being light transmissive on the areas corresponding to the character regions;

means for generating electrical control signals corresponding to the different characters to be displayed to impress an electrical potential difference across certain combinations of the electrode pairs corresponding to different characters to be displayed;

first means responsive to the control signals for displaying the corresponding characters as dark characters on a light background at the first face of the cell in the presence of ambient light incident upon the first face of the cell; and second means responsive to the control signals for displaying the same corresponding characters as light characters on a dark background at the first face of the cell in the absence of ambient light incident upon the first face of the cell.

* * * * *